Dec. 25, 1928.  
H. H. GREEN  
AGRICULTURAL MACHINE  
Filed June 10, 1926  
1,696,299  
2 Sheets-Sheet 1
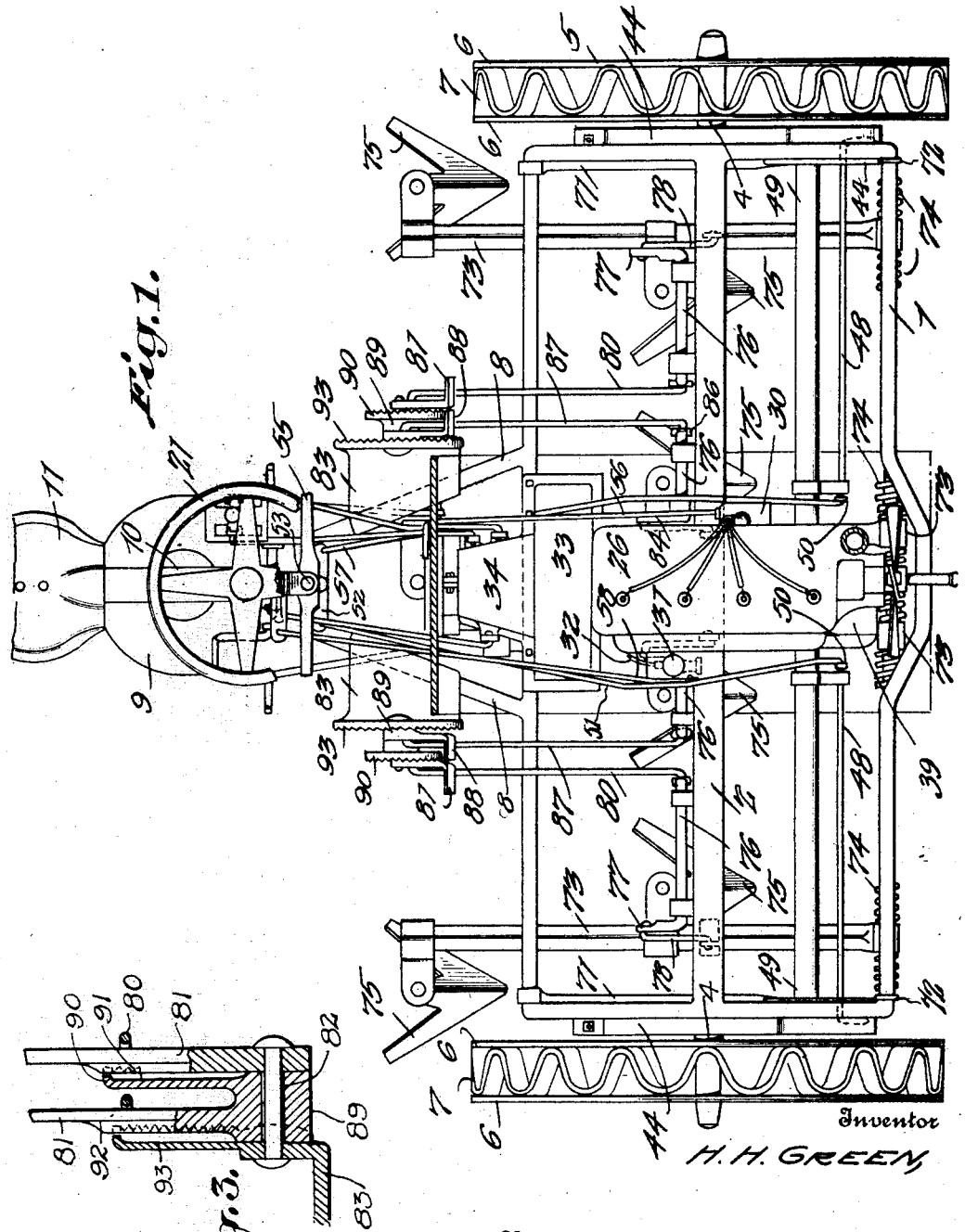

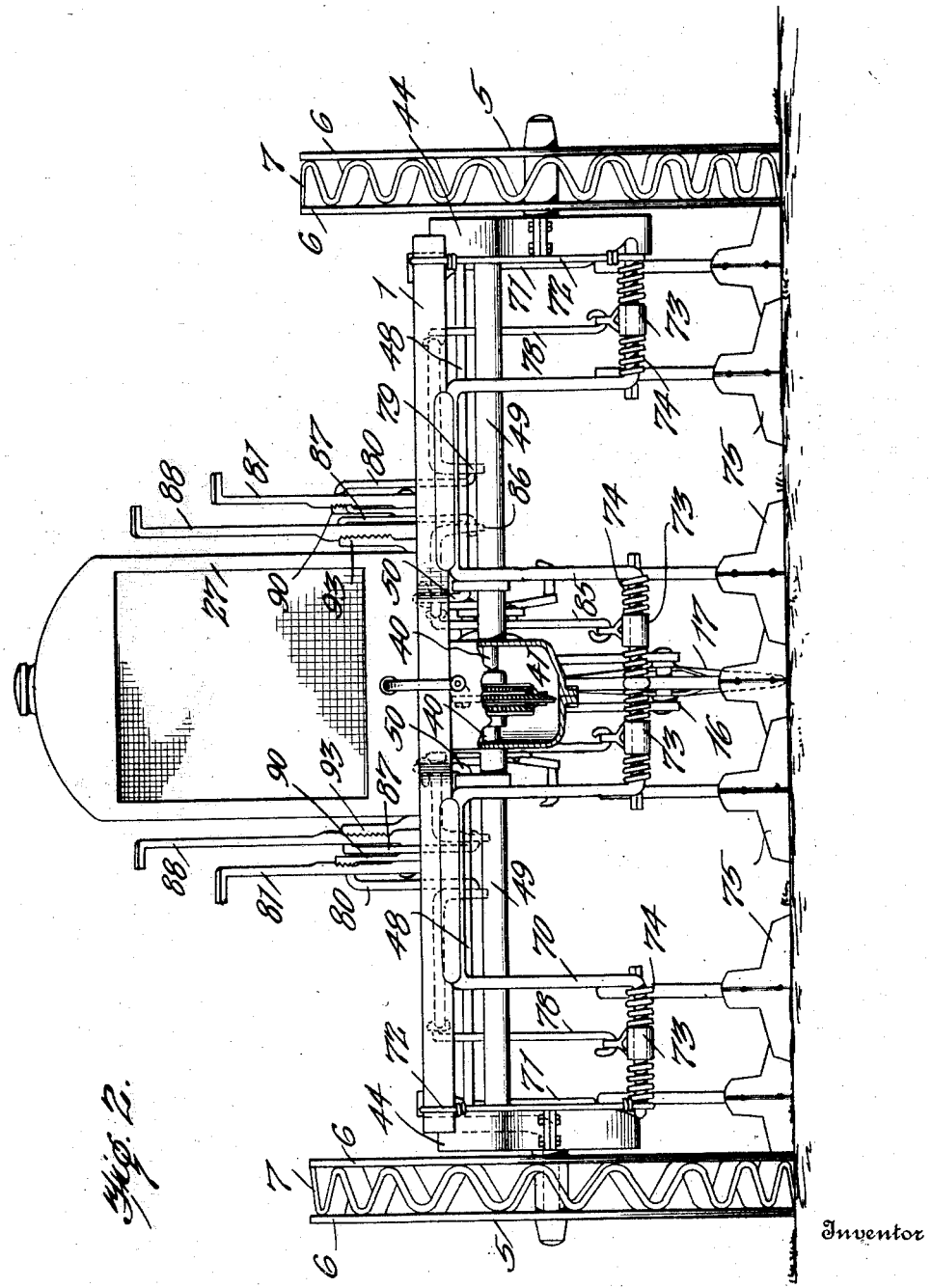

Patented Dec. 25, 1928.

1,696,299

UNITED STATES PATENT OFFICE.

HOWARD H. GREEN, OF BARDWELL, TEXAS.

AGRICULTURAL MACHINE.

Application filed June 10, 1926. Serial No. 114,997.

My invention relates to agricultural machines and more particularly to a plow or cultivator which carries its own motor and may be steered over a field to effect tilling and planting operations.

One object of the invention is to provide a machine of the stated type which will act upon two or more rows simultaneously, and to provide novel means whereby the depth to which plows or cultivators may enter the ground will be easily controlled.

Another object of the invention is to provide improved means to adjust the earth-working implements vertically and permit companion implements to be adjusted either individually or as a unit.

These several stated objects, and other objects are attained in such a machine as is illustrated in the accompanying drawings, and the invention resides in certain novel features which will be particularly pointed out in the appended claim.

In the drawings:

Figure 1 is a plan view of a tilling machine embodying my invention;

Fig. 2 is a front elevation, partly broken away and in section, of the same, and Fig. 3 is an enlarged detail section through the mounting of the hand levers.

Referring more particularly to the drawings, the numeral 1 designates the main frame of the machine which is preferably rectangular, as shown most clearly in Fig. 1, and may be of any desired dimensions. This frame will preferably be constructed of channel bars or like material and has a central transverse beam 2 which aids in imparting rigidity to the frame and in supporting the engine and other parts. At its sides the frame carries spindles 4 upon which are rotatably mounted ground wheels 5. These ground wheels each include a hub member and spokes radiating therefrom and two rims 6 which are spaced transversely from each other. Between the rims is disposed a tread member 7 which is in the form of a sinuous bar set on edge so that it has alternating portions extending in opposite diagonal directions between the two rims. This form of tread provides an efficient ground-engaging element so that the wheels will travel readily over the field and have efficient tractive engagement therewith while at the same time the packing of the soil by the wheels is avoided and the tread portion of the wheel is sufficiently open to prevent the soil collecting therein and clogging the free travel of the machine. Extending rearwardly from the rear side of the main frame are arms 8 which are secured at their rear ends to a platform 9 on which is secured a seat standard 10 carrying the driver's seat 11. A wheel 17 is mounted at the rear of the frame in a yoke 16 and this wheel constitutes a steering wheel, and suitable steering means is provided to turn the wheel and yoke including a hand wheel 21 disposed in front of the seat 11.

At the center of the main frame and disposed longitudinally thereof, an internal combustion engine 26 is mounted thereon, this engine being of any approved detail construction and the usual radiator 27 being provided at the front of the frame. The engine is equipped on one side with a timing and ignition mechanism, indicated conventionally at 30 and having suitable control means, and upon the opposite side is equipped with a carbureter 31 also having suitable control means, a fuel pipe 32 being provided to connect the carbureter with a fuel tank and there being the usual connections between the timer and the spark plugs of the engine. In rear of the engine, there is provided a clutch housing 33 and a transmission 34 which are also indicated conventionally and may be of any approved design so that rotary motion may be transmitted through suitable shafting to a differential 41 from which extend shafts 40 through shaft casings 49 into gear housings 44 so that rotary motion may be imparted to the wheels 5 by suitable gearing. Brake means is provided for each wheel and includes rock shafts 48 having arms 50 at their inner ends engaged by rods 51 which extend rearwardly of the frame and are connected with brake-applying means in front of the steering wheel. This brake-applying means consists of a post 53 rotatably mounted in a vertical position and provided adjacent its lower end with a cross bar 52 engaged by the rods 51 and adjacent its upper end carrying a handle bar 55 by means of which the post may be rotated to move the rods longitudinally to apply and release the brakes.

Carried by the front bar of the main frame are hangers 70 which may conveniently be formed from a tube or rod bent to provide a plurality of U-shaped portions having their upper members bolted, brazed or otherwise rigidly secured to the main frame, and from the ends of these hangers braces 71 extend rearwardly and upwardly to be secured to the rear bar of the main frame, these braces being preferably formed as an integral part of the hanger element. To provide additional support for the hanger element at the points where the braces 71 recede, suspension elements 72 are secured at their upper ends about the corners of the main frame and at their lower ends to the lower horizontally extending end portions of the hanger element. In the present embodiment of the invention, cultivator beams 73 are hung at their front ends upon the lower horizontal portions of the hanger element 70 and coiled torsion springs 74 are fitted about the hangers at the opposite sides of the cultivator beams and have their opposite ends engaged respectively with the hangers and the beams so that, while the beams will be held normally in operative position, they may yield readily to large rocks, roots or other obstructions which may be encountered and clear the obstructions without breakage or other damage to any of the parts. Cultivator or plow blades 75 are carried by the several beams 73 and it will be noted at once that, in the illustrated arrangement, there are at least two plows or cultivators disposed at each side of two adjacent rows. Journaled in suitable bearings provided therefor on the rear side of the beam or axle member 2 of the main frame are rock shafts 76, these rock shafts corresponding in number and relative arrangement with the number and relative arrangement of the beams 73. The outer rock shafts 76 are provided at their outer ends with cranks 77 which normally extend horizontally rearward and have attached thereto hanger links 78 which depend therefrom and have their lower ends engaged with the respectively adjacent plow beam 73. At the inner end of each outer rock shaft 76 is a crank 79 which normally extends downwardly and has pivoted to its free end a link or connecting rod 80 which extends rearwardly and is pivotally attached to a hand lever 81 loosely mounted upon a pivot bolt or pin 82 secured in a bracket 83 which is, in turn, rigidly secured upon the adjacent supporting arm 8. Each inner rock shaft 76 is provided at its inner end with a crank 84 normally extending rearwardly and having pivoted to its free end a link 85 which depends therefrom and is engaged at its lower end with the respectively subjacent beam 73. The outer end of each inner rock shaft 76 is equipped with a normally depending crank 86, to the free end of which is pivoted the front end of a link or connecting rod 87 which extends rearwardly therefrom and has its rear end pivoted to a hand lever 88. The lever 88 is formed integral with a hub member 89 which fits loosely about the pivot rod 82 at the side of the lever 81 and at the end of the hub member which bears against the lever 81 is formed a locking segment 90, the teeth of which are adapted to be engaged by a rib or lug 91 on the adjacent side of the said hand lever 81. The lever 88 is formed with a corresponding locking lug or rib 92 which is adapted to cooperate with a locking plate 93 formed on or rigidly secured to the bracket 83. This arrangement permits me to set all the plows at one side of the machine simultaneously or to set one gang of plows independently of the other gang of plows. If the lever 81 be rocked, having been first released from its engagement with the locking plate 90, the outermost plow beam 73 at the corresponding side of the machine will be raised or lowered while the inner plow beam 73 at that same side of the machine will remain at rest and undisturbed. If, while the lever 81 is held out of engagement with the locking plate 90, the lever 88 be released from the locking plate 93 and then rocked forwardly or backwardly, the innermost plow beam will be raised or lowered while the outer beam will be held at rest. If, however, the lever 88 be rocked while the lever 81 remains in engagement with the locking plate 90, the locking plate 90 will swing with the lever 88 and, of course, the lever 81 will then be likewise rocked so that both plow beams 73 at the corresponding side of the machine will be set. I am thus enabled to set the plows so as to run at any desired depth.

From the foregoing description, taken in connection with the accompanying drawings, it will be seen that I have provided a very compact machine which carries its own power and which may be easily steered so as to follow the rows or hills being cultivated, and it will be understood that the machine may be made sufficiently wide to cover any practical number of rows so as to cultivate them all simultaneously. While I have illustrated cultivating implements carried by the machine, it will, of course, be understood that breaking plows or planters may be substituted for the cultivators without requiring any change in the construction of the machine or any rearrangement of its operating parts. The engine and the elements by which the engine is driven and connected with the ground-engaging implements may be of any preferred form and are manipulated in the usual manner. By setting either brake, the machine may be quickly caused to make a short turn and it may be caused to follow closely the line of the rows or furrows by setting the steering wheel 17 in the proper angular position.

Having thus described the invention, I claim:

In an agricultural machine, a main frame, ground-engaging instrumentalities carried by the main frame and movable vertically into and out of engagement with the ground, rock shafts mounted over the respective instrumentalities and each connected at one end with one of said instrumentalities, a crank arm for each shaft, a bracket carried by said frame rearwardly from said rock shafts and having an upstanding portion constituting a rack, a pivot element carried by said bracket and extending transversely therefrom, a lever loose upon said pivot adjacent said bracket and having a tooth engageable with the rack to releasably hold the lever in a set position, said lever having a hub extension and a rack extending upwardly therefrom at the opposite side of the lever from the first rack, a second lever loose upon said pivot and having a tooth engageable with the second rack to releasably connect the levers for unitary movement and permit independent movement of the levers, and rods connecting said levers with the crank arms of said shafts whereby movement of the levers will rotate the shafts to vertically adjust the ground-engaging instrumentalities.

In testimony whereof I affix my signature.

HOWARD H. GREEN. [L. S.]